Aug. 24, 1948.
F. BERRY
2,447,608
ROTARY INTERNAL-COMBUSTION ENGINE OF
THE ROTARY ABUTMENT TYPE
Filed May 29, 1944
15 Sheets-Sheet 1
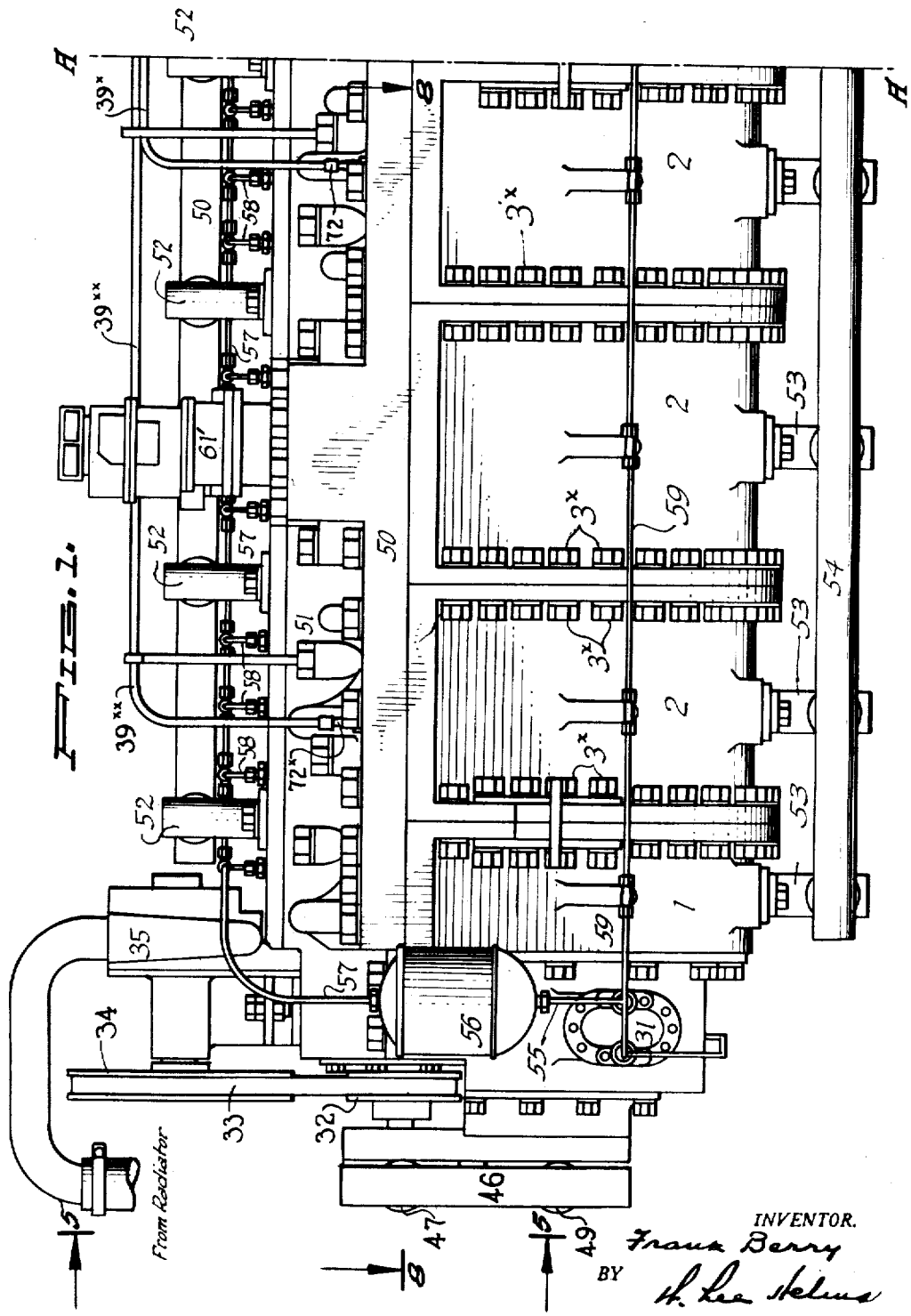
INVENTOR.
Frank Berry
BY
ATTORNEY.

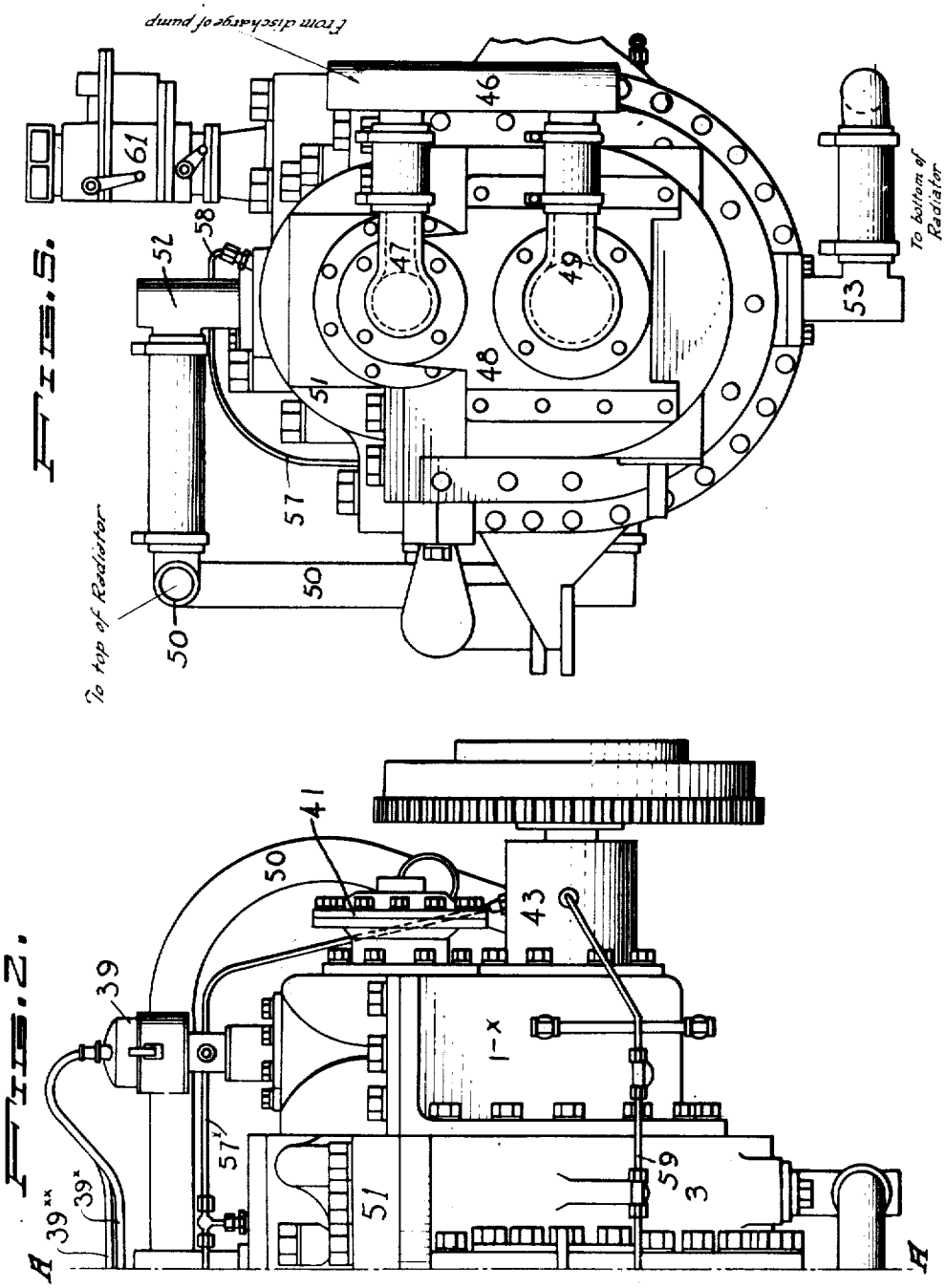

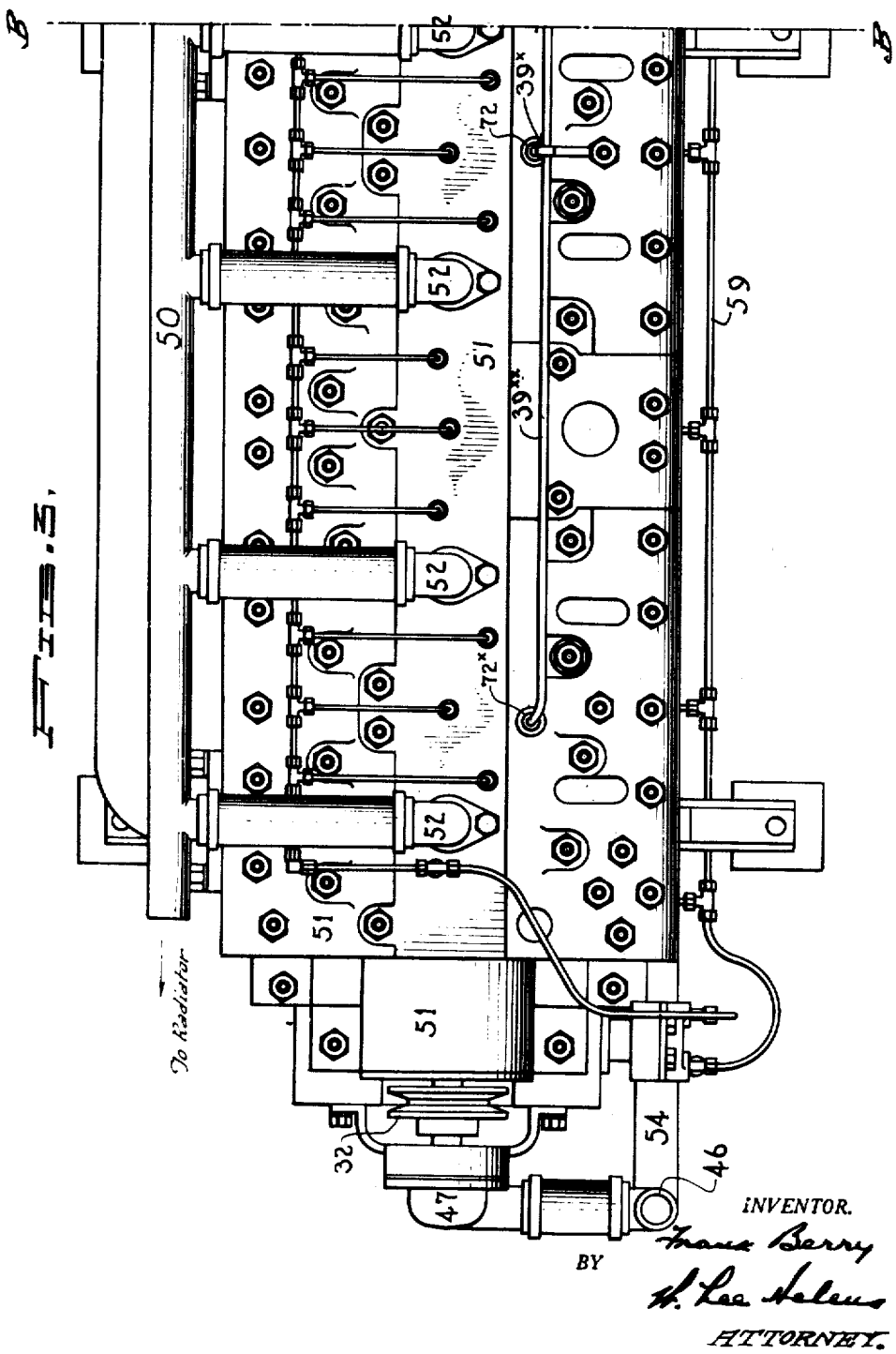

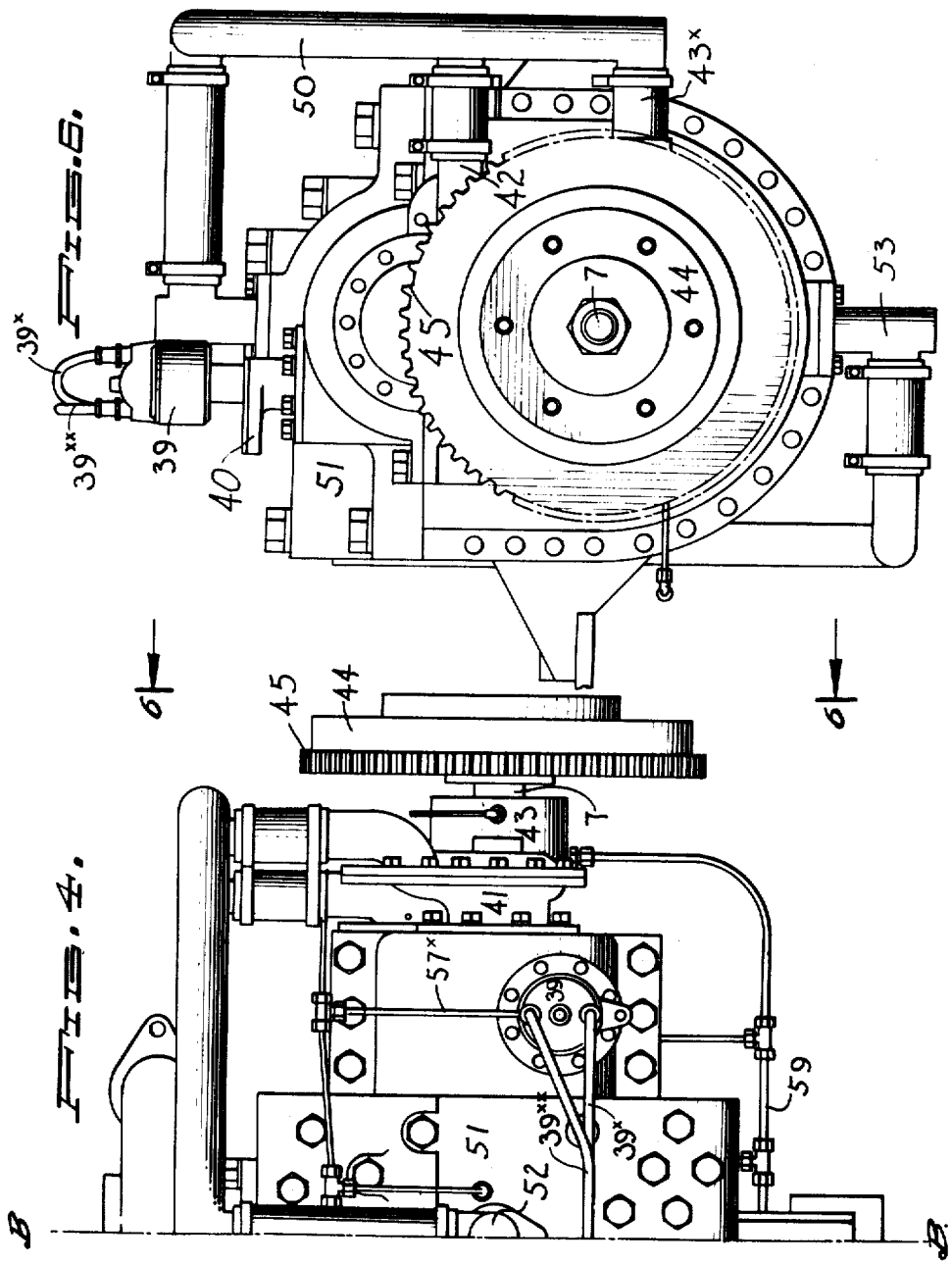

Aug. 24, 1948.                F. BERRY                2,447,608
               ROTARY INTERNAL-COMBUSTION ENGINE OF
                    THE ROTARY ABUTMENT TYPE
Filed May 29, 1944                              15 Sheets-Sheet 5
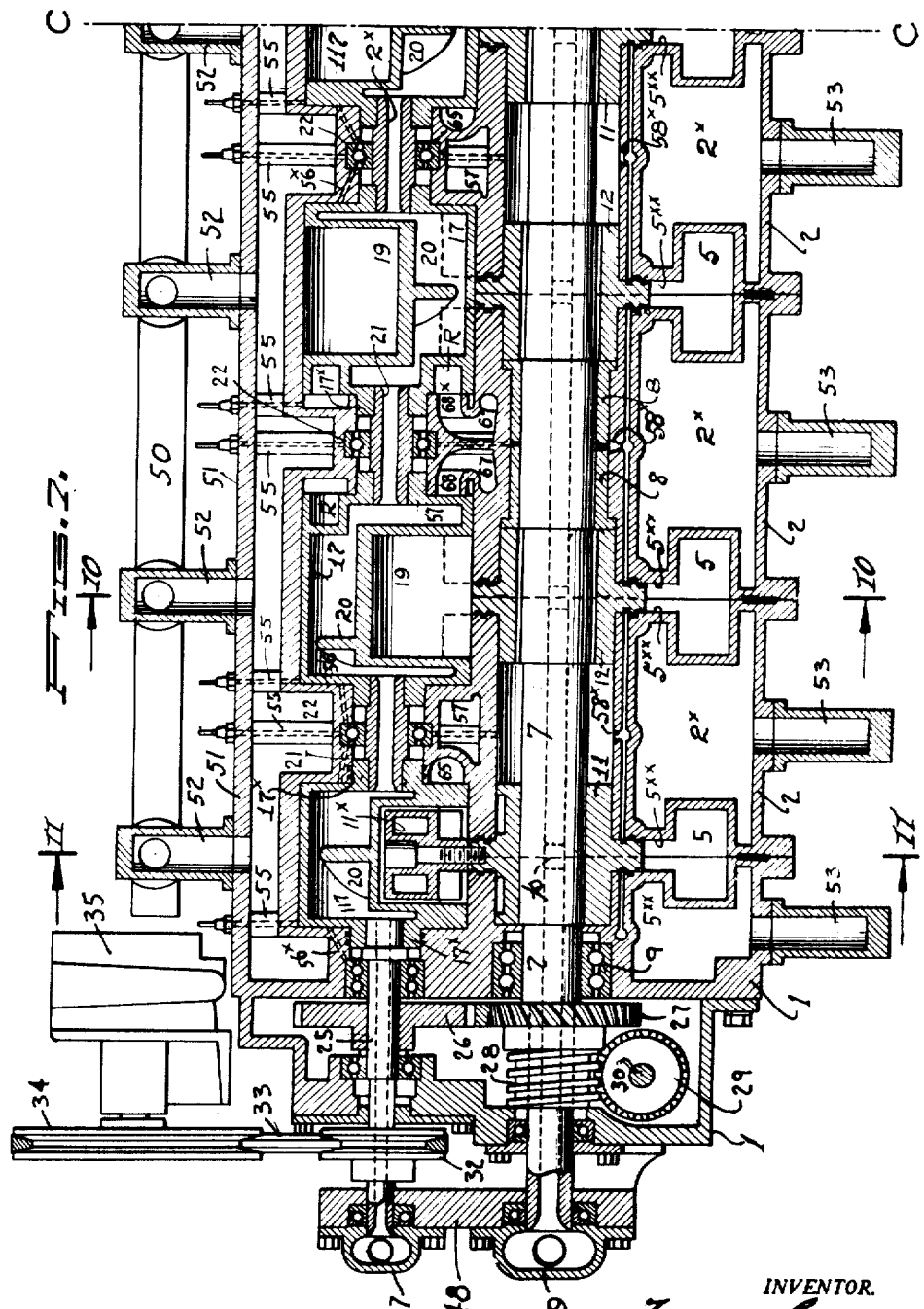
INVENTOR.
Frank Berry
BY
H. Lee Helms
ATTORNEY.

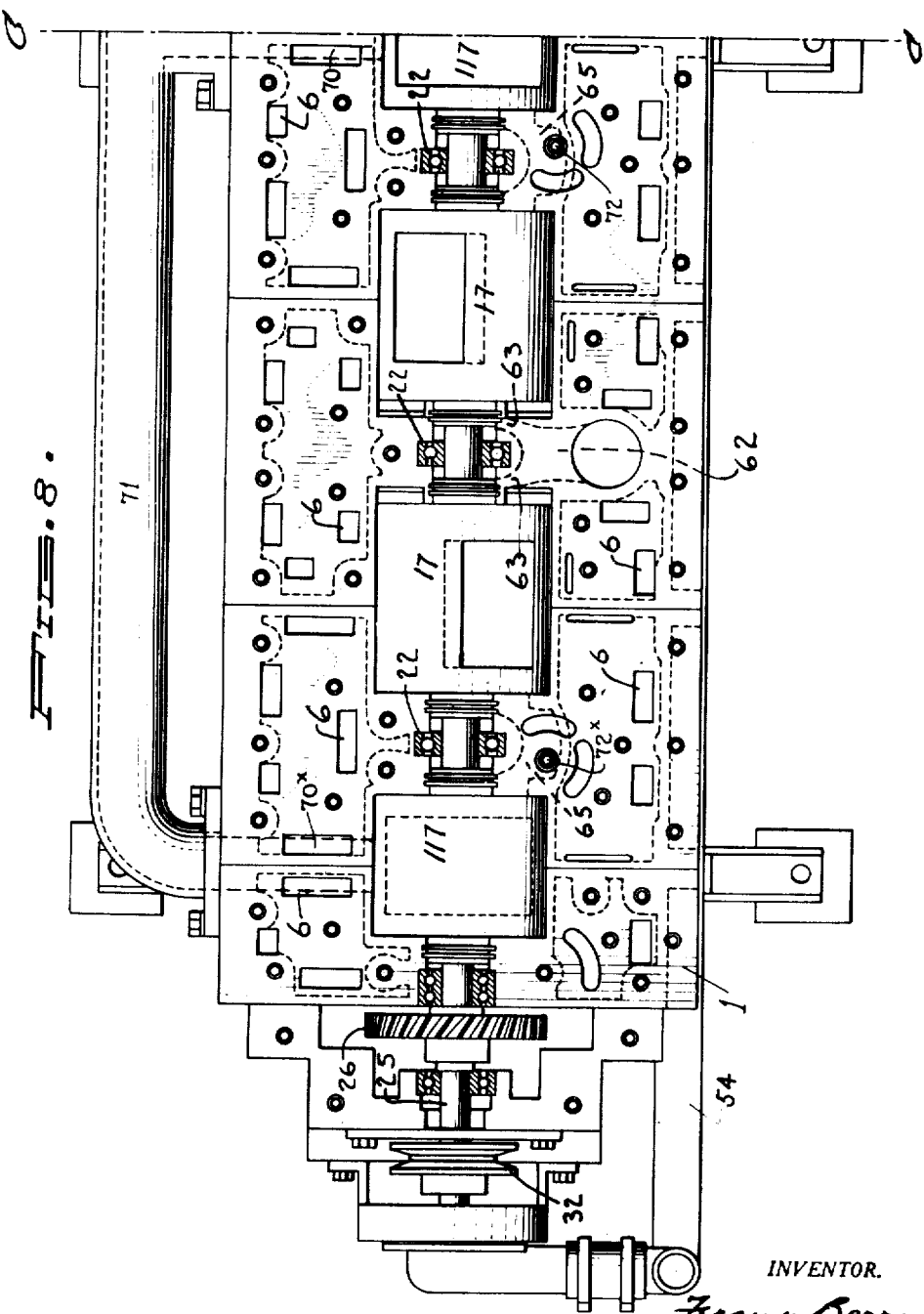

Aug. 24, 1948.  F. BERRY  2,447,608
ROTARY INTERNAL-COMBUSTION ENGINE OF
THE ROTARY ABUTMENT TYPE
Filed May 29, 1944  15 Sheets-Sheet 7
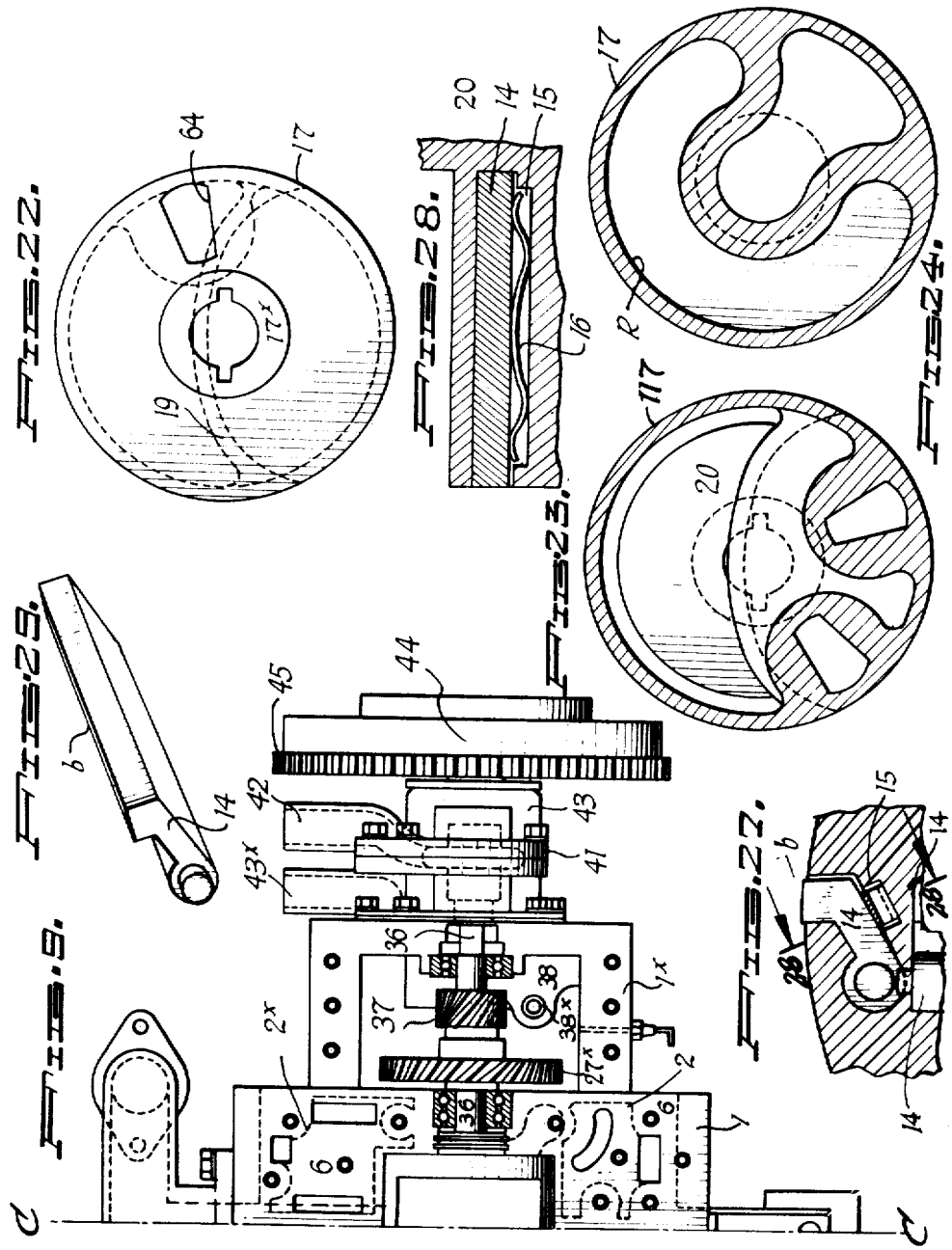
INVENTOR.
Franz Berry
BY
H. Lee Helms
ATTORNEY.

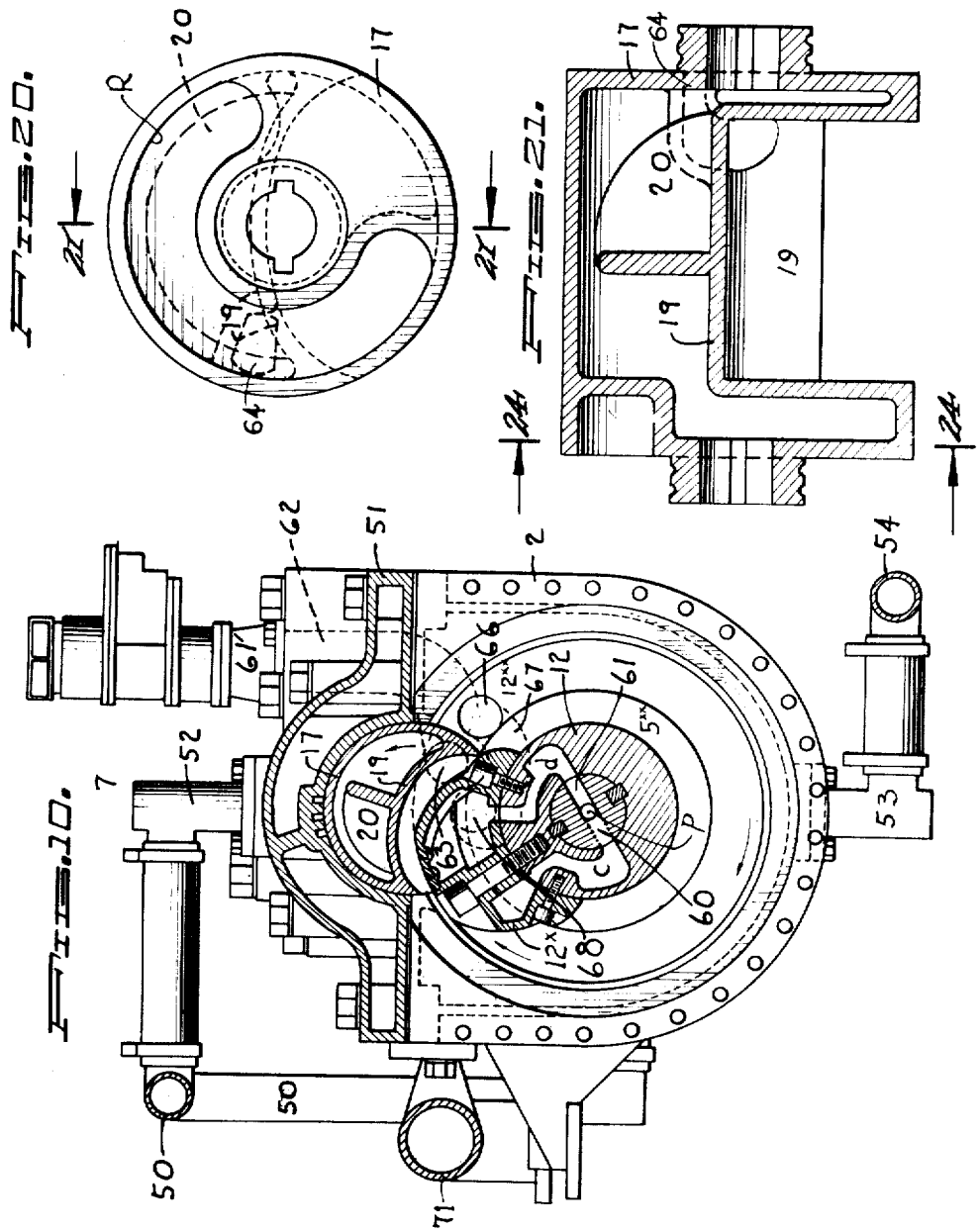

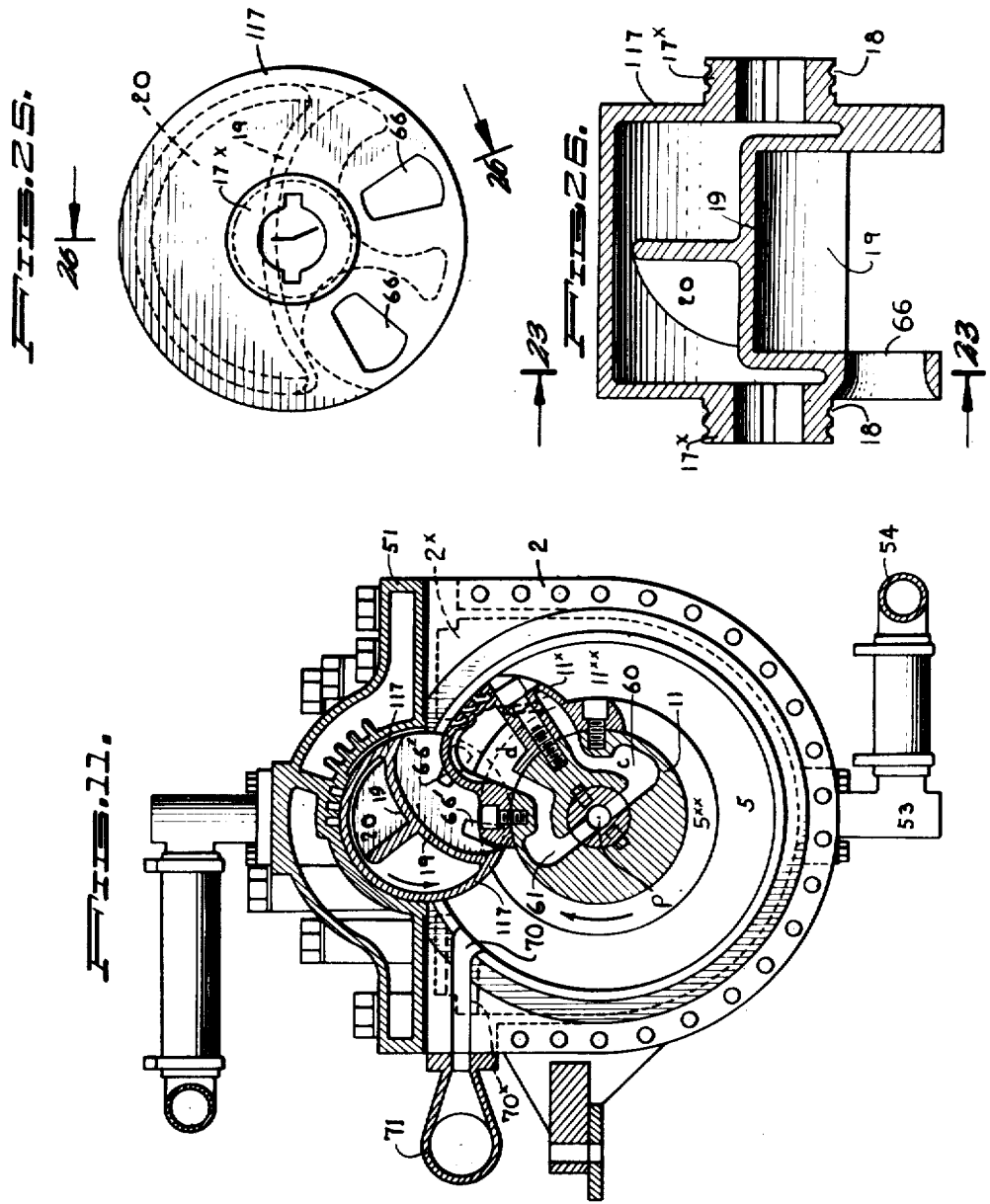

Aug. 24, 1948.                    F. BERRY                    2,447,608
                ROTARY INTERNAL-COMBUSTION ENGINE OF
                       THE ROTARY ABUTMENT TYPE
Filed May 29, 1944                                     15 Sheets-Sheet 10
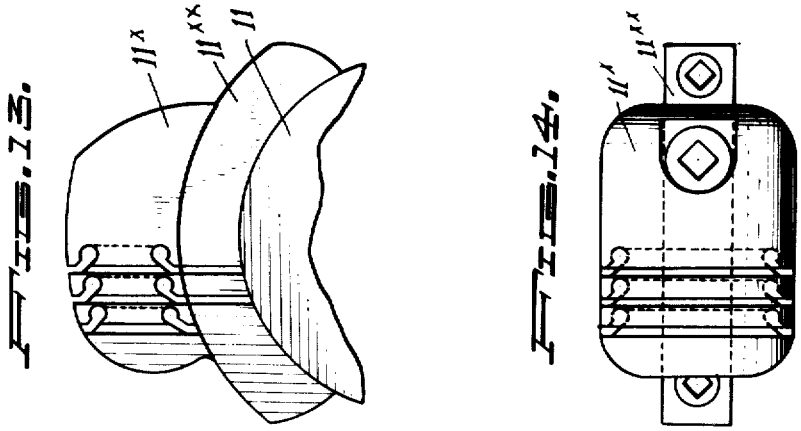
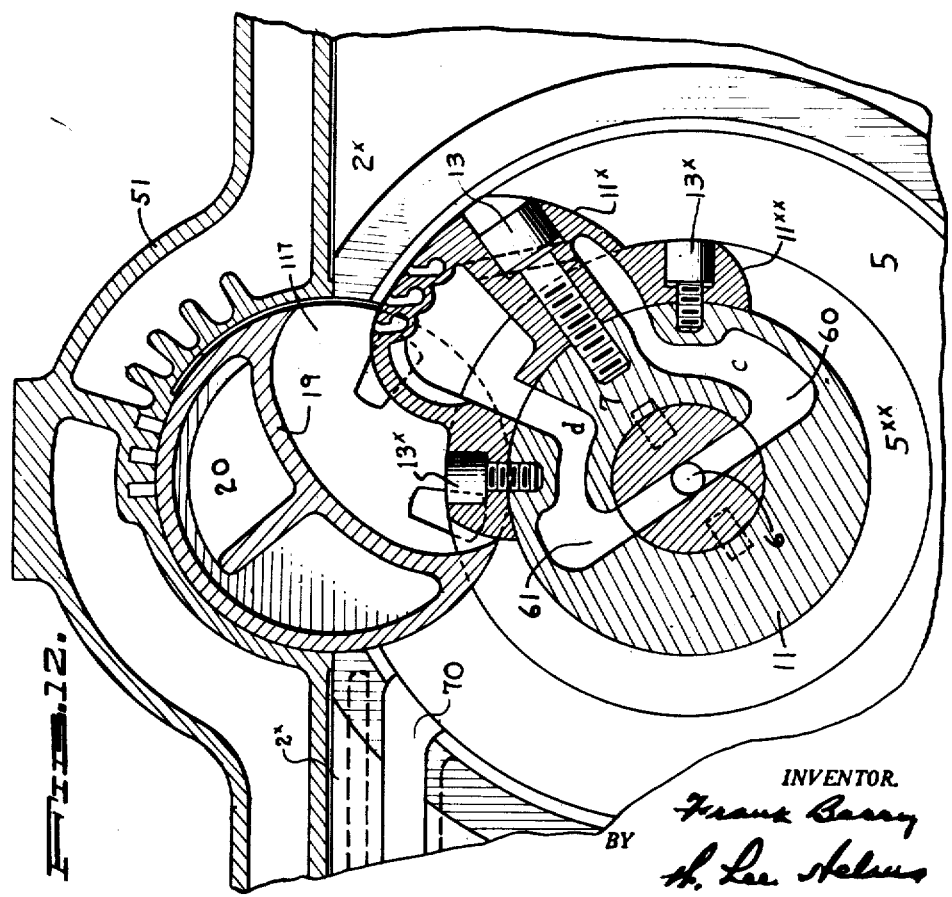
INVENTOR.
Frank Berry
BY
H. Lee Helms
ATTORNEY.

Aug. 24, 1948.  F. BERRY  2,447,608
ROTARY INTERNAL-COMBUSTION ENGINE OF
THE ROTARY ABUTMENT TYPE
Filed May 29, 1944  15 Sheets-Sheet 11
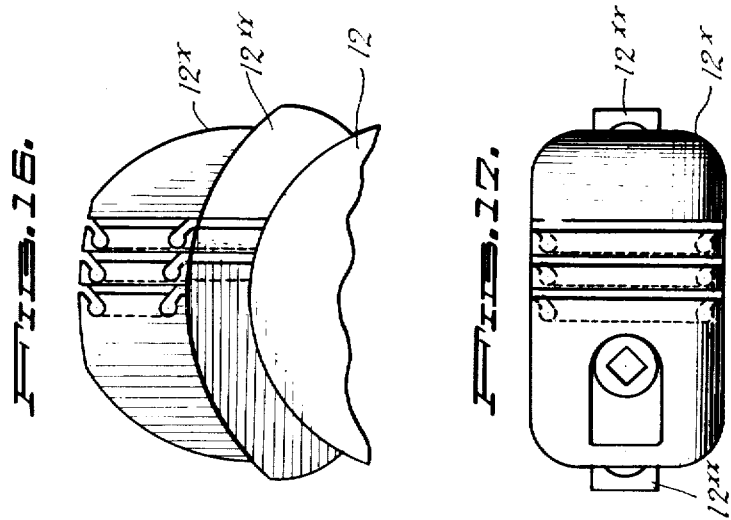
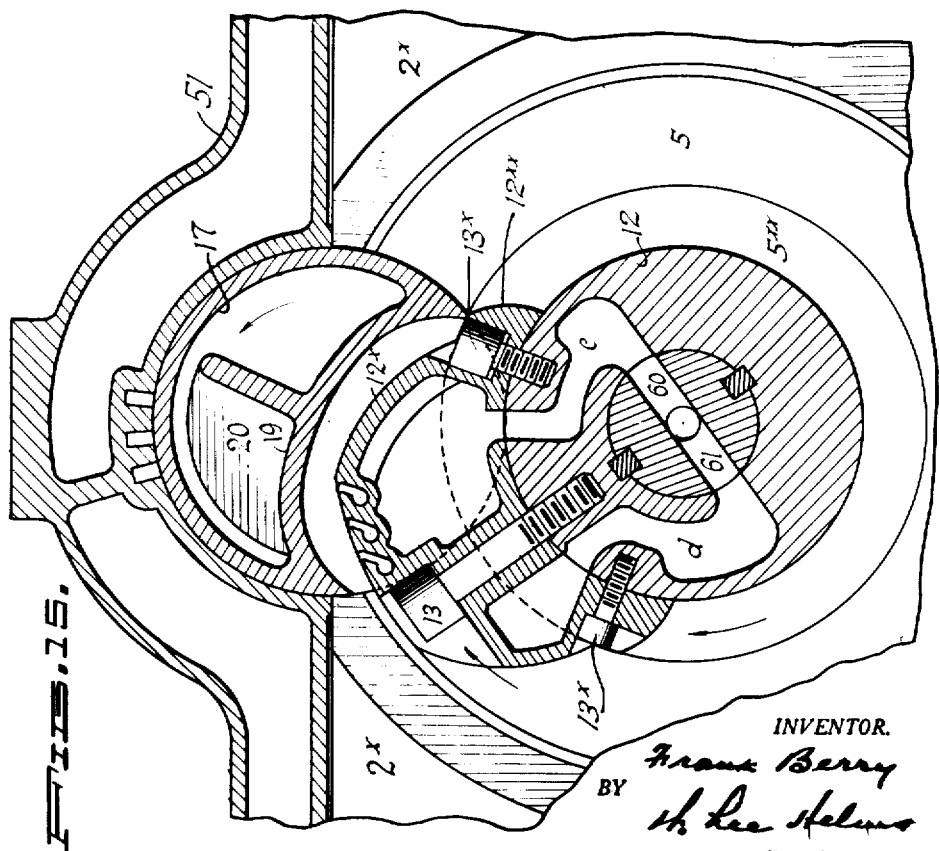
INVENTOR.
Frank Berry
BY
Th. Lee Helms
ATTORNEY.

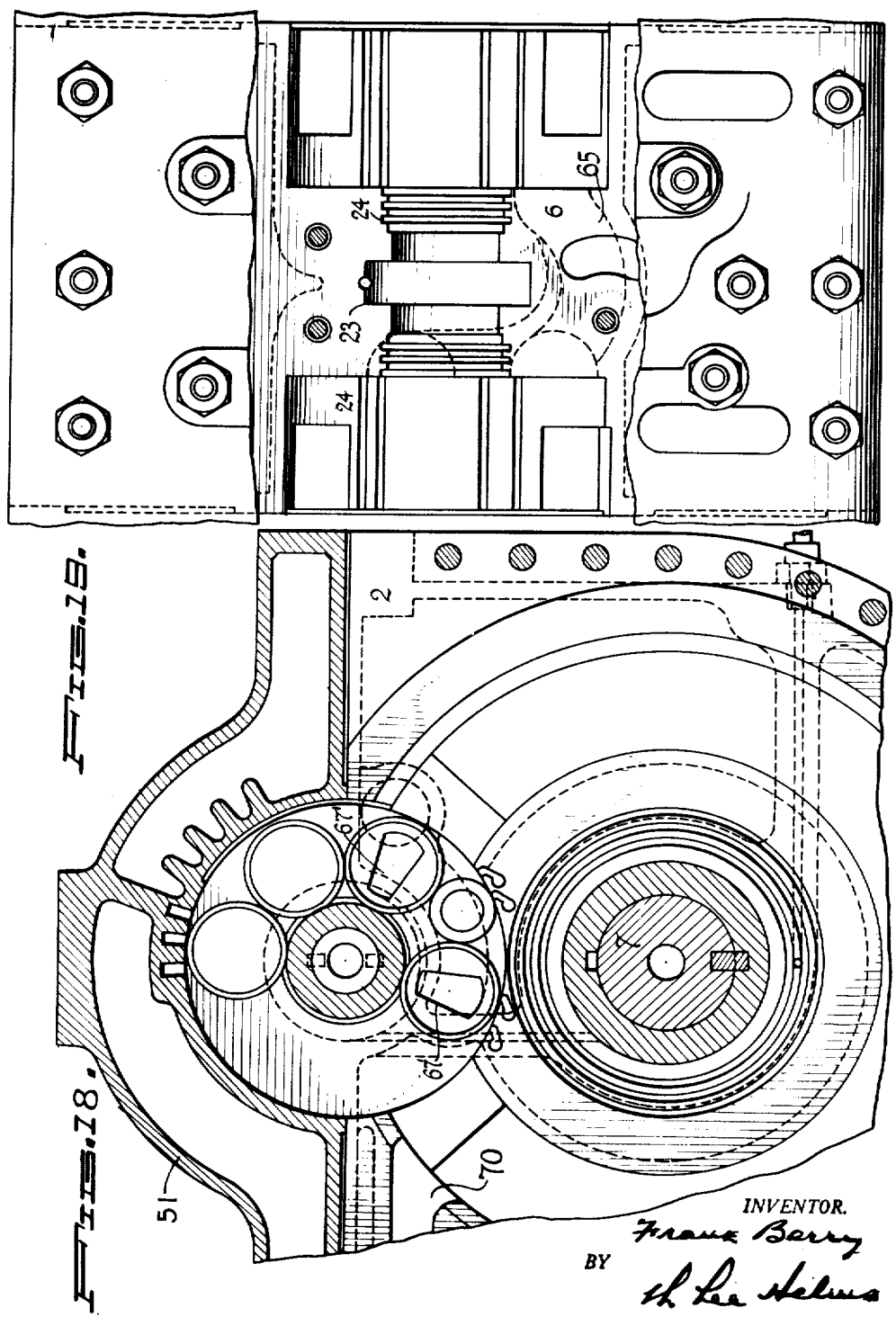

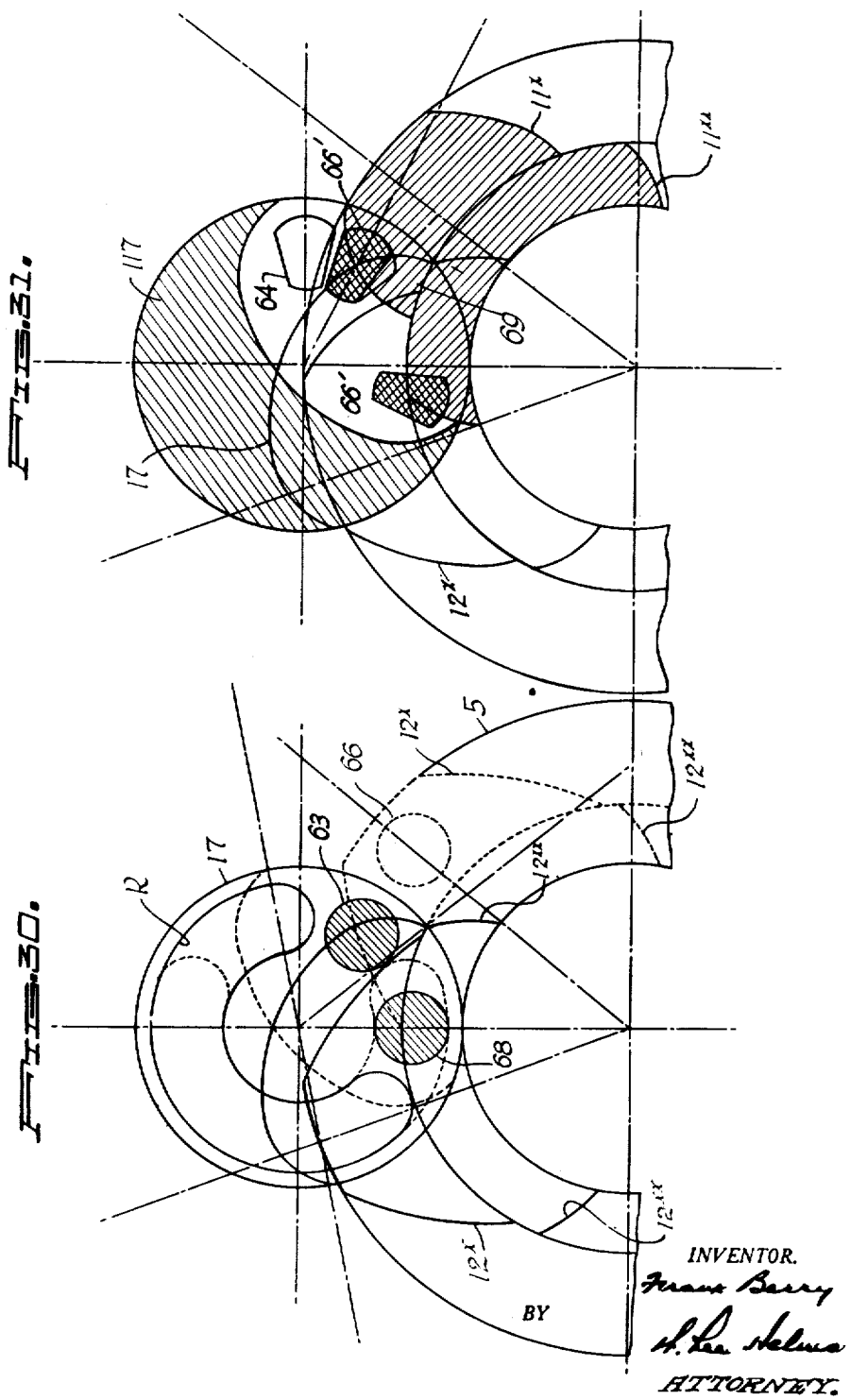

Aug. 24, 1948.                F. BERRY                 2,447,608
              ROTARY INTERNAL-COMBUSTION ENGINE OF
                     THE ROTARY ABUTMENT TYPE
Filed May 29, 1944                           15 Sheets-Sheet 14
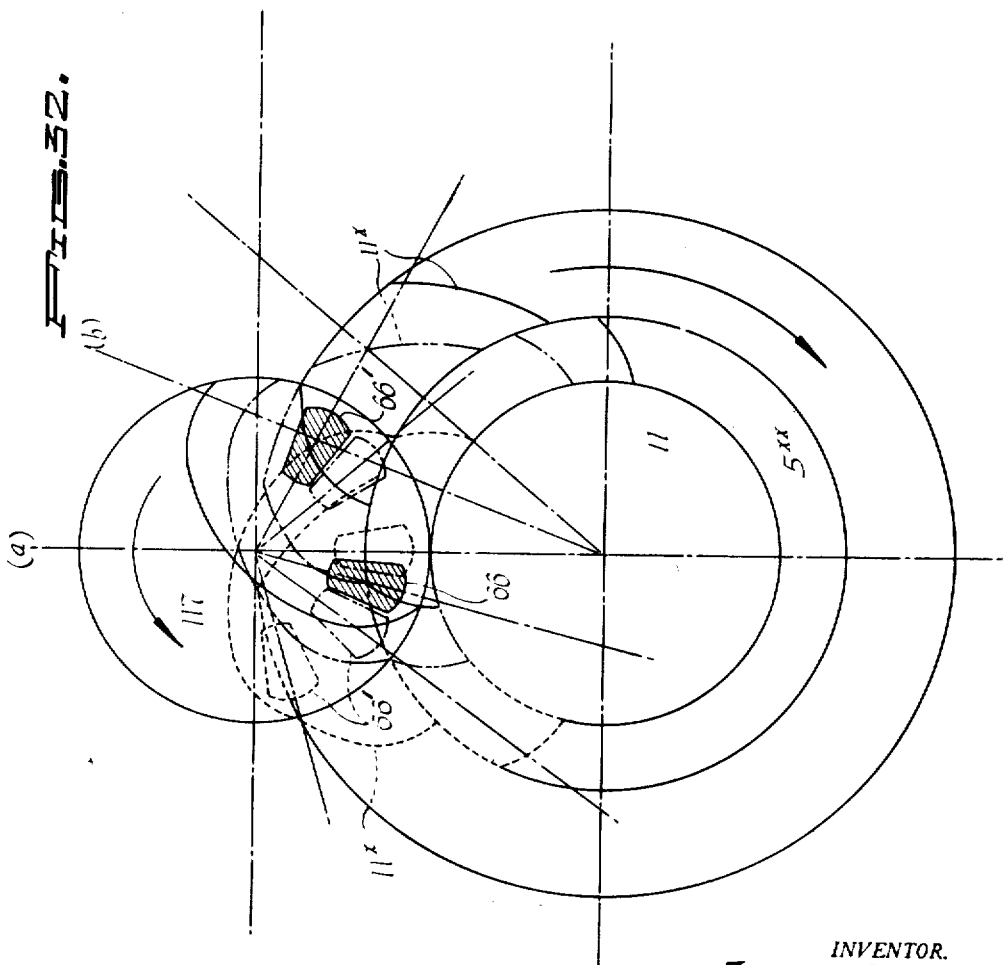
INVENTOR.
Frank Berry
BY
th. Lee Helms
ATTORNEY.

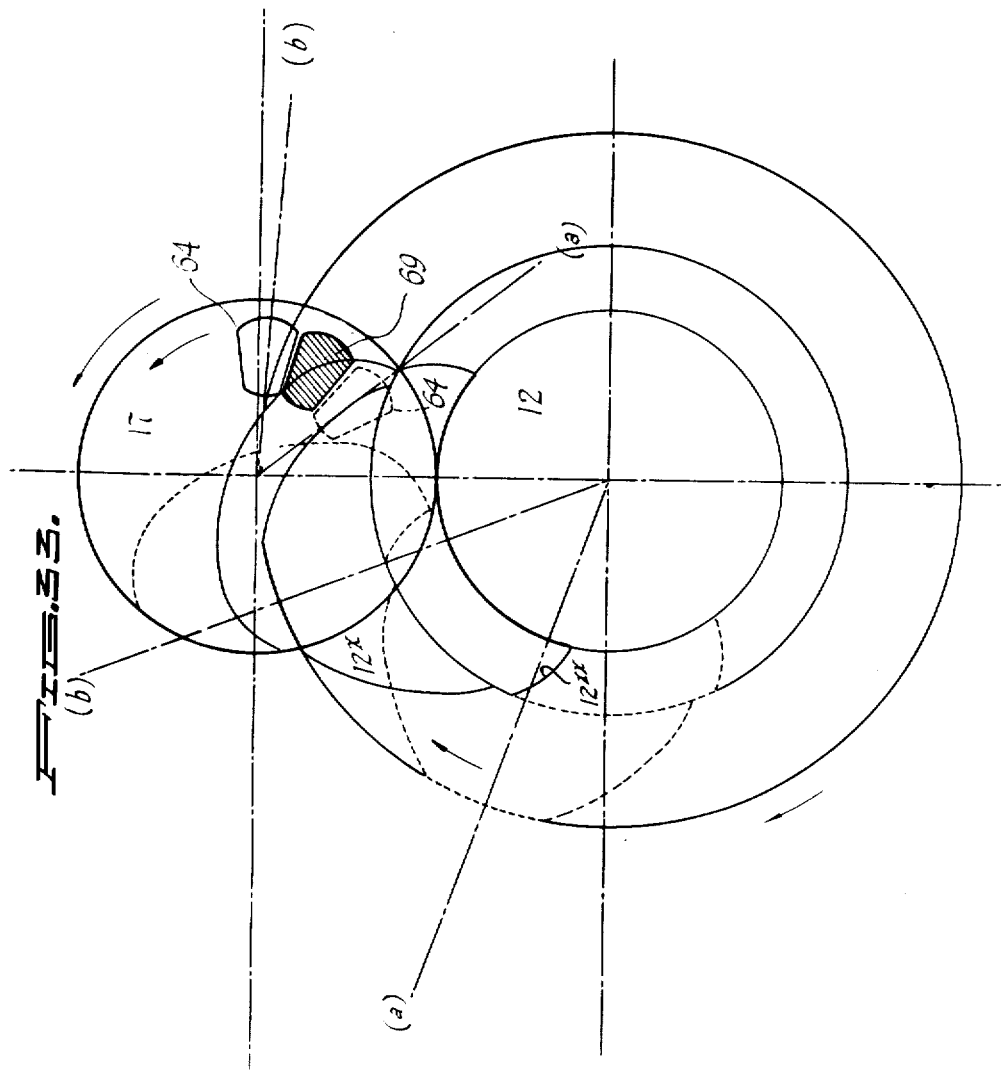

Patented Aug. 24, 1948

2,447,608

UNITED STATES PATENT OFFICE 2,447,608

ROTARY INTERNAL-COMBUSTION ENGINE OF THE ROTARY ABUTMENT TYPE

Frank Berry, Corinth, Miss.

Application May 29, 1944, Serial No. 537,907

12 Claims. (Cl. 123—13)

The present invention relates to a rotary motor, consisting of series of rotary piston and rotary abutment combinations, which in the embodiment illustrated, consist of sets of firing and compression rotors, the piston rotors being on a common shaft and the abutment rotors being on a series of jack shafts. The piston rotors consist of alternately arranged firing and compression rotors, coacting with firing and compression abutment rotors, and acting in such manner that fuel gas under compression by one set of coacting compression members is valve-passed to an adjacent set of co-acting firing members, via a pre-combustion chamber. Prior to firing, the latter chamber, in each case, is shut off from the compression chamber by continued movement of the compression rotors. Firing is initiated in the appropriate pre-combustion chambers, and the flaming gas enters the firing cylinders through ports in the appropriate firing abutment rotors. No valves are employed in these operations except those provided by the rotor elements themselves and consisting of ports formed in the abutment rotors and in the casing walls abutted by the latter rotors.

The piston and abutment rotors are of special form, as hereinafter explained in detail, and the various objects of the invention will be hereinafter set forth. The primary object of the invention is to provide a high-speed rotary motor, capable of long periods of operation without repair, and which will develop high power with relatively low weight and bulk. At the same time assembly and disassembly is facilitated. Thus, by removing a head common to all of the rotors, together with removal of an accessory bracket, all of the abutment rotors, together with their bearings and shaft drive gear, may be removed as a unit, which action will expose the piston rotors and enable ready removal of the detachable pistons therefrom, or the replacement of compression sealing elements carried by the pistons, without removal of the pistons themselves. High efficiency is secured with simple elements capable of long operation without derangement, as now to be described in connection with the accompanying drawing.

In the drawing:

Figure 1 is a view in elevation of a motor embodying the invention, the right hand portion being broken away at the lines A—A.

Figure 2 is a view in elevation continuing and completing the right hand end of the motor.

Figure 3 is a plan view of the embodiment, the right hand portion being broken away on the line B—B.

Figure 4 is a plan view in elevation continuing and completing the right hand end of the motor.

Figure 5 is a view in elevation at the left hand end of the motor, as seen from the line 5—5, Figure 1.

Figure 6 is a view in elevation at the right hand end of the motor, as seen from the line 6—6, Figure 4.

Figure 7 is a vertical section taken longitudinally through the motor, the latter being broken away at the line C—C.

Figure 8 is a plan view of the structure shown in Figure 7, with the head removed, the view being in part a section on the line 8—8, Figure 1.

Figure 9 is a plan view of the structure shown in Figure 2 with the main head and bracket head removed.

Figure 10 is a vertical section on the line 10—10, Figure 7, showing the compression rotors at final compression position.

Figure 11 is a vertical section on the line 11—11, Figure 7, showing the combustion rotors at the instant of firing.

Figure 12 is an enlarged fragmentary vertical section, showing the combustion rotors at the instant of firing.

Figure 13 is a detail and fragmentary view showing the top area of one of the combustion rotors and its piston, the pivoted piston seals having been removed.

Figure 14 is a plan view of the structure shown in the preceding figure.

Figure 15 is an enlarged fragmentary view showing the compression piston rotors at the position of highest compression.

Figure 16 is a fragmentary view in elevation showing the top area of the compression piston rotor with its piston and pivoted seals in position.

Figure 17 is a plan view of the structure shown in Figure 16.

Figure 18 is an enlarged fragmentary view of one of the end casings, the view being in section, the section being through the removable head and the rotor shafts.

Figure 19 is a fragmentary plan view of one of the cast casing units, broken away at its top and exposing one-half of a combustion cylinder and a like section of a compression cylinder, parts of the motor head being shown.

Figure 20 is an elevation of the intake end of one of the compression abutment rotors.

Figure 21 is a vertical section taken longitudinally of said compression abutment rotor on the line 21—21, Figure 20.

Figure 22 is a view in elevation of the discharge end of the compression abutment rotor.

Figure 23 is a vertical section taken through one of the combustion abutment rotors on the line 23—23, Figure 26.

Figure 24 is a vertical section taken through a compression abutment rotor on the line 24—24, Figure 21.

Figure 25 is an end elevation of the combustion abutment rotor at the gas inlet end thereof.

Figure 26 is a vertical-angular section on the line 26—26, Figure 25.

Figure 27 is a fragmentary section through one of the rotors, illustrating a piston seal in transverse section, together with its tension spring.

Figure 28 is a sectional view on the line 28—28, Figure 27.

Figure 29 is an isometric view of the piston seal which will hereinafter be termed the pivoted seal.

Figure 30 is a schematic view showing in full and dotted line one of the compression piston rotors and its abutment rotor in full compression, and (by dotted lines) the beginning of fuel intake. In this figure the hatched discs represent ports in the casing for the abutment rotor.

Figure 31 is a schematic view showing in cross section a combustion rotor piston and its abutment rotor, and showing in curved outline the companion compression abutment and compression piston, certain ports being shown in full and in hatched line to constitute a timing graph.

Figure 32 is a schematic view showing a combustion rotor with its piston and the co-acting combustion rotor, the valve ports of the latter being shown by hatched line. The figure shows by dotted line successive movements of the two rotors with various positions of the combustion abutment rotor ports, relatively to corresponding positions of the combustion rotor piston.

Figure 33 is a schematic view showing the outlines of a compression piston rotor and co-acting compression abutment rotor, showing in full lines the relative positions of the compression rotor piston and the compression rotor abutment at the instant of firing in the companion combustion cylinder, dotted lines indicating other positions.

Referring to the drawings it will be seen that the engine consists of a plurality of lower casings 1, 2, and 3 (Figures 1 and 2), which casings are flanged and secured together by any suitable means, such as the bolts 3X. Said casing sections may be rounded at their bases as shown in Figures 5 and 6, and they will have flat top areas. The top faces of the casings 1, 2, and 3 are best shown in Figure 8. Rreferring to that figure it will be seen that in the present embodiment the abutting areas of the casings are so formed as to provide chambers. Each of these chambers receives an uppermost abutment rotor and an underlying piston rotor of greater diameter at the piston area thereof, as shown more particularly in Figures 10 and 11. Here the abutment rotors consist of two outermost combustion rotors 117, and two central compression abutment rotors 17, as shown in Figure 8.

Form of the casings

Comparison of Figures 7 and 10 will show the formation of intermediate casings of the structure, these casings being indicated at 2. Each consists of a single casting, having a large intermediate water jacket at 2X, Figure 7, and lateral walls shaped to define one-half of a piston rotor chamber 5. When the casings 2 are bolted together these rotor chambers are completed with the exception of those at the ends of the motor. The end sections are generally similar to the intermediate casings but each provides one-half only of a rotor chamber, as shown in Figure 7, with reference to Figures 8 and 9. The water chambers 2X, and the flat top walls of casings 1 and 2 are formed with apertures, such as those indicated at 6, for the passage of water or other cooling liquid.

As shown in Figure 7 the assembled castings 1 and 2 provide a central longitudinally extending shaft passageway, which receives a shaft 7, having centrally disposed bearing members 8 and end bearings 9, which may be of ball or roller type.

The piston rotors

As stated above, the outermost piston rotors are in combustion cylinders, heretofore termed rotor chambers, whereas, the two central piston rotors are in compression cylinders which are larger than the combustion cylinders. All of the piston rotors are alike in general construction and method of cooling. Each piston rotor has a hub directly mounted on shaft 7 and keyed thereto, and the piston in each case is a separate hollow member as shown more particularly in Figures 12 to 17, inclusive. The combustion piston rotors are indicated at 11, and the compression piston rotors are shown at 12. The pistons for the combustion rotors are shown at 11X, and the pistons for the compression rotors are shown at 12X. Each piston is formed with a shouldered seat for receiving a heavy central threaded stud, which passes through an aperture at the seat and is threaded into the piston rotor, as shown in Figures 12 and 15, and two additional seats are provided for two additional studs 13X, the central stud being indicated at 13.

While the pistons of the combustion rotors have different front and rear face contours than the compression pistons, the pistons are alike in other respects. They are flat walled at their sides. In each case the top of the piston is curved to conform with the curvature of the inner casing wall opposed to said top area of the piston, and pivoted seals are preferably employed for all of the pistons.

The pivoted seals for the pistons

The form of the pivoted seals for the pistons is best shown in Figures 27 and 29. Each seal consists of a plate-like member having a projected tapered bearing face at b, the pivoted seal itself being indicated at 14. Opposite the bearing face area the plate is formed with a rounded or bulbous base to be received in a corresponding aperture formed in a piston wall and to serve as a pivot. As indicated in Figure 27 the pivoted seals are inserted endwise into receiving apertures formed in the piston walls, which apertures include recesses (at 15, Figure 27) in which are placed springs 16 (Figure 28), which normally hold the pivoted seals with their tapered faces projected outwardly.

In the present embodiment three pivoted seals are employed for the bottom of each side face, three are employed for each top area of the individual piston, three for each side, and two for each side of the elongated and relatively narrow piston base which serves as an auxiliary piston, the function of which will later be described in detail. The said base, or supplemental piston, of the combustion rotor is indicated at 11XX, while that for the compression rotor is indicated at 12XX.

The placement of the pivoted seals in any one of the pistons can be effected in such manner that the seals are mutually engaged so as to be latched against displacement by mutual contact. This is done by inserting the top pivoted seals, the length of which is so proportioned that they are overlapped by the side pivoted seals, which in turn are overlapped by the bottom pivoted seals. The method of "overlapping" such seals is somewhat schematically indicated in Figure 27. It will be noted that the hub or axis end of the seal 14 has been reduced to form clearance for a pin-like projection on the hub of the underlying seal b. Thus the hub of the underlying seal b will bar movement toward it of the overlying seal 14.

*The base formation of the pistons*

By reference to Figure 7 it will be seen that the base or supplemental piston area of piston 11X is relatively narrow so that the latter, for effective action, must have lateral contact bases throughout its circumferential path. At its upper position, as shown in Figures 12 and 15, the lateral wall contact is provided by the opposed walls of the clearance opening in the abutment rotor. At all other points the said relatively narrow supplementary piston abuts opposed contact bases 5XX inwardly of the main rotor chambers 5. The flat side walls and arcuate top wall of each main piston area will lie in close relationship to the inner walls of the rotor chambers with slip contact provided by the pivoted seals.

*The abutment rotors*

The compression and combustion abutment rotors are alike in formation. The combustion abutment rotor is best shown in Figures 12, 25, and 26 and 117. It is formed with laterally projected hub 17X, formed with ring receiving grooves 18. The sides of each combustion abutment rotor are flat and parallel, and between the walls there is extended a web 19, arcuate in form, and providing a face which moves in opposition to the top of the combustion piston with which the abutment operates.

Each casting or casing member 2 at its top will be formed for reception of the said abutment rotors and their bearings. Reference to Figure 26 will show that interiorly of the hub 17X of each abutment rotor a hollow chamber is provided for flow of cool liquid, which flow is guided by a baffle 20. All of the abutment rotors may initially be connected by hollow jack shafts 21 in the manner illustrated in Figure 7 and these jack shafts are encircled by bearing rings 22 adapted to be received in seats at 23, Figure 19. At opposite sides of these ring seats 23, the top of each casing 2 is formed with channel ways at 24 to receive the rings on hub 17X of the appropriate abutment rotor. The end casing 1, likewise, are formed with a bearing seat and a single ring seat, as indicated in Figure 7, with reference to Figures 8 and 9.

*The drive for the combustion and compression rotors and for the abutment rotors*

As above described, the abutment rotors are connected by the hollow jack shafts 21. The left hand or initial abutment rotor receives in its left hand hub a hollow drive shaft 25 carrying a spiral toothed pinion 26 in mesh with a spiral gear 27 on the left hand end of shaft 7. Shaft 7 has mounted thereon a worm 28 in mesh with a worm wheel 29 on a shaft 30. This shaft leads to and drives an oil pump within a casing 31 shown in Figure 1. This oil pump may be of any standard construction and its details are not illustrated.

The left hand end of the abutment shaft assembly, i. e., shaft 25, carries a pulley 32 having a belt drive connection 33, with a pulley 34 on a shaft leading to and operating water pump 35 (Figure 7). The right hand (Figure 9) member 36 of the abutment shaft assembly carries a spiral gear 37 in mesh with a gear (not shown) on the lower end of a distributor shaft, which end is supported by the walls of an aperture 38X in a bracket 38. As indicated in Figure 6, and also Figure 2, the distributor itself is indicated at 39, being controlled as to relative positions of contacts and distributor arm by movements of control lever 40, as customary in such cases.

A suitable water pump is disposed in split housing 41, and the pump is driven by shaft 36 (Figure 9). Shaft 36 is hollow and feeds into the water pump, the discharge duct of the water pump being indicated at 42.

The right hand end of the hollow piston shaft 7 assembly discharges into a water pump having a casing 43, Figures 9 and 2. The shaft projects outwardly of the water pump and carries a balance wheel 44 and the latter may be provided with a toothed ring 45 for connection with a starter.

*Cooling liquid circulation*

A suitable radiator (not shown) will dischange into a water pump or circulator 35, which has been hereinbefore mentioned. Referring to Figure 5, it will be noted that a vertical manifold 46 having a branch connection 47 is bolted to a bracket 48, Figure 7, the interior of connection 47 communicating with the interior of the abutment shaft assembly. Manifold 46 is provided with a second branch 49, likewise, bolted upon bracket 48 and communicating with the interior of shaft assembly 7. In passing through the said shaft assemblies, heat is absorbed by the cooling liquid, and the hot liquid, hereinafter termed water, is drawn by water pump 41 through discharge duct 42 into a conduit 50, which likewise receives hot water drawn through hollow shaft assembly 7 by water pump 43, the latter discharging through a duct 43X.

The motor head 51 is apertured for communication with a plurality of hollow risers 52 which, as shown in Figure 3, communicate with pipe 50, so that by thermosyphon action the hot water from the cooling passages 2X and the hollow head 51, is drawn off to aforesaid radiator (not shown), with which pipe 50 communicates. The cooled water from the radiator enters the motor casings through branch pipes 53, leading upwardly from pipe 54, which will directly receive cool water from the radiator.

*The oiling system*

At the right hand end casing 1, a gear box 1X is affixed and it serves as a collection chamber for oil. At the left hand end of the motor, casing 1 serves for oil collection. The oil reaches these collection points as follows: pump 31 (Figure 1) forces oil through pipe 55, through pressure filter 56 (Figure 1), and thence through a feed pipe 57 mounted on top of the motor and having a plurality of branch pipes 58. The said branch pipes lead downwardly through the motor head, through the intermediary of duct members 55 cast in the motor head. Seven of the said cast ducts are shown in Figure 7, and as indicated in Figures 3 and 4, they will be increased in number for complete lubrication of the abutment rotors and their bearings. During the finishing of the motor head the said duct-like members 55 will be apertured by drilling through them as indicated by the dotted lines on Figure 7, and additional oil passage will be formed by diagonal drilled apertures as indicated at 56.

The oil forced through ducts 55 will be brought under pressure in contact with the moving surfaces of the abutment rotors and their bearings, and ducts 57 will carry oil downwardly from the bearings on the jack shafts 21 to shaft 7. The oil collected from shaft 7 will pass through apertures at 58X in the bottom wall of the casing shaft receiving aperture, for shaft 7, said oil flowing into longitudinal passageways communicating with draw-off pipe 59, Figures 1 and 3, which feeds the oil pump. Pipe 59, likewise communicates with the gear box IX and left hand end casing I, so that when oil rises in these members it is drawn off to feed the oil pump. Supplemental oil feed pipes will communicate with feed pipe 57, such as distributor oil feed pipe 57X, for feeding oil to various bearings and other rotating parts.

Cooling the piston rotors

Reference to Figures 10 and 11 will show that the circulatory arrangement of the piston rotors is the same for both combustion and compression pistons; and, therefore, the same symbols will be used. The cool water drawn through hollow shaft 7 is given a circuitous path. It first strikes a plug p and is diverted through an angular duct at 60 (Figure 11). The diverted cooling liquid, as for example, water, will pass into the cooler side of the rotor piston and into cooling chamber c. It will then flow to chamber d and out through angular duct 61 at the opposite side of the plug p.

Cooling of the abutment rotors

The water pumped through the jack shafts and accompanying end shafts, which are hollow as above described, passes into the hollow area of each abutment rotor, which hollow area contains the fin-like member 20. This member, surrounded by the cooling water, increases the heat transfer from the abutment rotor and also effects turbulence in the water passing from one end of the abutment rotor assembly to the other end.

Intake of fuel gas to compressors

Mounted on the engine head is a carburetor 61'. The discharge from the carburetor for the fuel mixture is indicated by dotted lines in Figure 10 at 62. It is a duct which communicates with a port 63 (Figure 10) for one of the compression cylinders, and a corresponding port for the adjacent compression cylinder. The suction passage of the fuel mixture into the compression area will be described with reference to the port 63 of Figure 10.

In Figure 10 fuel intake port 63 is closed by the flat wall face of the abutment rotor between the ends of a curved recess R (Figure 20) formed in the same side of the rotor, said curved recess extending, in this embodiment, about 252°. The compression piston rotor and its co-acting abutment rotor are, in the position of Figure 10, nearing the point of highest compression. The face of the abutment rotor for the compression cylinder opposite that having the arcuate passageway is provided with a relatively large fuel discharge port, which is indicated at 64, Figure 22. Comparison of Figures 20 and 22, showing opposite ends of the compression rotor 17, will make this arrangement clear. The compressed gases are being passed through said port 64 into a precombustion chamber 65, between the appropriate compression chamber and its adjacent combustion chamber. An intake port 66 is formed in the wall of the compression casing adjacent that face of the compression abutment rotor 17 which is formed with the arcuate recess R (Figure 10). Intake port 66 communicates by a duct at 67 in the casing wall and leading to a port 68 controlled by said arcuate recess R in the abutment roto 17. In the position of Figure 10 port 63 is closed by said flat face.

Reference to Figure 8 will show that the precombustion chamber for the left hand combustion rotor-assembly receives the compressed fuel gas in a left hand flow, the flow being opposite for the right hand rotor-assembly and into a like pre-combustion chamber 65.

When the compression rotor piston 12X has passed over and is about to expose port 66, the arcuate recess R of the abutment rotor brings ports 63 and 68 into communication and the continued movement of the piston 12X draws fuel gas into the compression cylinder by suction whilst a preceding charge of fuel gas is being compressed by the opposite face of the piston acting against the abutment rotor.

Such inward flow of the fuel gas is continued until just before the piston 12X reaches the position of Figure 10.

Action of the combustion rotors

When the charge of fuel gas received by the compression rotors has been forced by the compression piston through port 64 of the compression abutment and into the pre-combustion chamber 65, continued movement of the abutment rotor 17 closes port 64 against the abutting casing wall. Prior to that time, and when port 64 is wide open to the pre-combustion chamber, intake ports 66' in the appropriate combustion aboutment rotor 117 (Figure 11) come into register with ports 67' in the adjacent casing wall (Figure 18) and communicating with the appropriate pre-combustion chamber.

Prior to the opening of ports 67 the fuel gas in the said pre-combustion chamber has been highly compressed therein and the compression piston 17 is still compressing while the fuel gas is flowing through ports 66', so that the ratio of compression is maintained and the volume is increased. When the ports 66' are wide open firing is initiated in the pre-combustion chamber, port 64 having closed. At this moment the relative positions of the combustion piston 11X, and its abutment are as shown in Figure 11, while compression piston 17 and its abutment are in the position of Figure 10.

The schematic graphs, Figures 30 to 33

Referring to the graph of Figure 30 it will be seen that the position of the compression rotors shown in full lines is that of Figure 10 and that they are nearing maximum compression. It will further be seen that the arcuate passage R does not afford communication between the fuel gas inlet ports 63, 68. When, however, the rotors have moved to the dotted line position, port 68 is opened and further slight movement of the abutment rotor will carry the arcuate passageway R over port 63 at which time gas will flow inward from the carburetor.

Figure 31 shows the corresponding time-positions of the compression and combustion rotors at time of firing. The combustion piston 11X, 11XX, and the abutment rotor 117 are shown hatched and the compression piston 12X and its abutment rotor 17 (as to the curved inner wall thereof) is shown in curved full lines. For clarity of illustration the combustion abutment rotor ports 66 are shown cross-hatched. The outlet port 64 of the compression abutment rotor is shown in full lines and the casing port leading from the compression cylinder to the combustion cylinder is indicated at 69. In the position of the members shown on the graph the ports 66' are wide open, and port 64 is out of communication with port 69.

The graph Figure 32 is designed to show the combustion piston and its abutment rotor in three positions, i. e., (a) scavenging, (b) start of fuel intake, and (c) position of firing. In the position (a) the members are shown in dotted lines; in position (b) by dot and dash lines; and in position (c) by full lines.

The purpose of the graph Figure 33 is to show the relative positions of the compression piston and its abutment rotor fuel discharge port at (a) the beginning and (b) the end of discharge of the compressed fuel gas. The casing outlet port to the pre-combustion chamber is shown at 69 in hatched lines for clarity of illustration.

*Firing*

The distributor 39 may be of conventional design having a rotor for two contact points leading to two conductors wires 39X, 39XX, and connected to the spark plugs 72, 72X. The two cylinders are preferably fired 180° apart relatively to the respective positions of the combustion rotors.

*The exhaust*

Each of the combustion cylinders is formed with an exhaust port 70. Referring to Figure 11 it will be seen that the exhaust port communicates with an exhaust pipe 70X cast in the main casing. Each exhaust pipe communicates with the exhaust manifold 71. The exhaust port 70 for each combustion cylinder is open at all times except when the combustion piston 11X moves over it. During the movement of the combustion piston from firing position, Figure 11, to the exhaust port, the piston acts to scavenge burnt gases remaining in the combustion chamber ahead of the piston. The burnt gases in the pre-combustion chamber are scavenged as follows. In the movement of the abutment rotor from firing position (Figure 11) the ports 66 are moved toward the exhaust port 70. When the piston 11X approaches the exhaust port toward the end of a power impulse one of the ports 66' registers with one port 67' in the pre-combustion chamber at the time when the piston clearance passageway of the abutment is open to the cylinder and the burnt gases remaining in the pre-combustion chamber pass to the exhaust port 70 which may be under atmospheric pressure only. When both abutment ports 66' come into register with ports 67' of the pre-combustion chamber firing takes place, the position then is not quite that of Figure 11, because the timing is preferably so controlled that firing takes place before ports 66' are in complete register with ports 67' and when the fuel gases have not passed into the cylinder in sufficient volume to equalize pressures both immediately back of the pistons and in the pre-combustion chamber.

It will be understood that various modifications may be made in the form and arrangement of the elements illustrated in the embodiment shown in the drawings. For example, the entire casing below its head, eliminating the ends, may be cast in one piece, the cylinders 5 may be round and the pistons conformed thereto, and any desired multiples of compressor and firing elements may be combined.

What I claim and desire to secure by Letters Patent is as follows:

1. In a rotary internal combustion motor having a casing, a compression chamber, a firing chamber adjacent thereto, piston and abutment rotors, a piston and a recessed abutment in each of said chambers, shafts for rotating said rotors, a duct for introducing gases into said compression chamber and for leading compressed gases from said compression chamber into said firing chamber, said shafts being operatively connected to rotate in unison, means for circulating cooling fluid around said chambers, and means for lubricating said rotors and shafts, the improvement which comprises a compression abutment arranged to provide a dwell communication between the compression chamber and its intake duct and a pre-combustion chamber formed in the casing between the compression and firing chambers, a duct for leading compressed gases into the same, and a duct controlled by the abutment rotor for leading compressed gases therefrom into said firing chamber, said pre-combustion chamber and the recessed portion of the abutment in the firing chamber and the piston rotor in the firing chamber all being in communication at the instant of firing.

2. A rotary internal combustion motor constructed in accordance with claim 1, in which the pistons are angularly related a number of degrees sufficient to cause the compression piston to reach maximum compression simultaneously with the firing piston reaching approximate firing position, communication between the pre-combustion chamber and the firing chamber being controlled by the abutment rotor.

3. In a rotary internal combustion motor having a casing, a compression chamber, a firing chamber adjacent thereto, piston and abutment rotors, a piston and an abutment in each of said chambers, a duct for introducing fuel gases into said compression chamber and duct means for leading compressed gases from said compression chamber into said firing chamber, said rotors being operatively connected to rotate in unison, means for circulating cooling fluid around said chambers, and means for lubricating said shafts and rotors, the improvement which comprises a compression abutment having a pair of disc-like ends, a hemicylindrical wall between said disc-like ends, one of said ends being formed with a depressed channel adapted to provide a dwell communication between an intake port in the compression chamber wall and a second port spaced therefrom and leading to a fuel gas supply, and a fuel discharge port in the other of said ends.

4. In a rotary internal combustion motor having a casing, a compression chamber, a firing chamber adjacent thereto, piston and abutment rotors, a piston and an abutment in each of said chambers, a duct for introducing fuel gases into said compression chamber and duct means for leading compressed gases from said compression chamber into said firing chamber, said rotors being operatively connected to rotate in unison, means for circulating cooling fluid around said chambers, and means for lubricating said shafts and rotors, the improvement which comprises a compression abutment rotor having a pair of disc-like ends, a hemicylindrical wall between said ends, at least one fuel gas intake duct in one of said ends, and a fuel gas discharge port in the other of said ends, said fuel gas intake duct of the compression abutment rotor being arcuate in form and being adapted to provide a dwell communication between an intake port in the compression chamber wall and a second port leading to a fuel gas supply.

5. In a rotary internal combustion motor having a casing, a compression chamber, a firing chamber adjacent thereto, a piston rotor and an abutment rotor, a piston and an abutment in each of said chambers, a duct for introducing gases into said compression chamber and for leading compressed gases from said compression chamber into said firing chamber, said rotors being operatively connected to rotate in unison, means for circulating cooling fluid around said chambers, and means for lubricating said rotors, the improvement which comprises a pre-combustion chamber located between the compression and firing chambers, a duct for leading compressed gases into the same, and a duct controlled by the abutment rotor for leading compressed gases therefrom into said firing chamber, a wall of the firing chamber adjacent the pre-combustion chamber and a wall of the abutment in the firing chamber being formed with a plurality of spaced ports adapted to communicate with the pre-combustion chamber, the abutment rotor being timed to bring both of the abutment ducts into communication with the pre-combustion chamber at the firing interval and one of its ducts into communication with the pre-combustion chamber at the termination of a power impulse of the firing piston, for scavenging of burnt gases from the pre-combustion chamber into the firing cylinder, said firing cylinder having an exhaust port.

6. An internal combustion motor having a casing, a compression chamber, a firing chamber adjacent thereto, piston and abutment rotors, a piston and an abutment in each of said chambers, a duct for introduction of fuel gases into said compression chamber, and means for leading compressed gases from said compression chamber into said firing chamber, the improvement which comprises a compression abutment having a pair of closed disc-like ends, an approximately hemicylindrical hollow member between said ends, a fuel gas intake channelway in one of said ends, a fuel discharge port in the other of said ends, inwardly and outwardly of said hemicylindrical hollow member.

7. In a rotary internal combustion motor, comprising a casing, having a plurality of compression chambers, a plurality of firing chambers adjacent thereto, piston and abutment rotors, a hollow piston and a hollow abutment in each of said chambers, said pistons being fixed to a rotatable shaft independent of the firing chambers, ducts for introducing gases into said compression chambers and for leading compressed gases from said compression chambers into said firing chambers, said shafts being operatively connected to rotate in unison, means for circulating cooling fluid around said chambers, and means for lubricating said rotors, the improvement which comprises a hub on each side of each abutment rotor, said hubs being in alinement, and rotatable tubular jack shafts fitted into said hubs and arranged in communication with the hollow interior of adjacent abutments, whereby said abutment rotors are rotatable as a unit, and cooling fluid may be passed through said jack shafts and into the abutment rotors.

8. In a rotary internal combustion motor, comprising a casing having a plurality of compression chambers, piston and abutment rotors, a plurality of firing chambers adjacent thereto, a piston and a hollow abutment in each of said chambers, said pistons being fixed to a rotatable shaft independent of the firing chambers, ducts for introducing gases into said compression chambers and for leading compressed gases from said compression chambers into said firing chambers, said rotors being operatively connected to rotate in unison, means for circulating cooling fluid around said chambers, and means for lubricating said rotors, the improvement which comprises a hub on each side of each abutment rotor, said hubs being in alinement, rotatable jackshafts fitted into said hubs and arranged in communication with the hollow interior of adjacent abutments, whereby said abutment rotors are rotatable as a unit, said abutments being hollow, a baffle in each of the same, said baffles being transverse to the axis of said jack shafts and extending radially outward and being spaced from the outer wall of said abutments.

9. In a rotary internal combustion motor a casing having a plurality of compression chambers, a plurality of firing chambers adjacent thereto, piston and abutment rotors, a piston and an abutment in each of said chambers, ducts for introducing gases into said compression chambers and for leading compressed gases from said compression chambers into said firing chambers, said shafts being operatively connected to rotate in unison, a housing for said elements, means for circulating cooling fluid around said chambers, and means for lubricating said rotors, the improvement which comprises a plurality of oil ducts extending downwardly from the top of said housing in proximity to said abutment rotor, bearings for said abutment rotor, said ducts being adapted to feed oil thereto, said piston rotor being below said abutment rotor, oil ducts from said abutment rotor to said piston rotor, and means for collecting used oil from the bottom of said casing and for recirculating the same.

10. In a rotary internal combustion motor a casing construction having a plurality of compression chambers, a plurality of firing chambers adjacent thereto, a removable casing head, piston and abutment rotors, a piston and an abutment in each of said chambers, ducts for introducing gases into said compression chambers and for leading compressed gases from said compression chambers into said firing chambers, said rotors being operatively connected to rotate in unison, means for circulating cooling fluid around said chambers, and means for lubricating said rotors, the improvement which comprises a plurality of oil ducts extending downwardly from the head of said casing into communication with said abutment rotor, bearings for said abutment rotor, said ducts being adapted to feed oil thereto, said piston rotor being below said abutment rotor, oil ducts from said abutment shaft to said piston rotor, additional oil ducts extending through the walls of said chambers to provide lubrication for said pistons and abutments and means for collecting used oil from the bottom of said casing and recirculating the same.

11. In a rotary internal combustion motor, a casing having a compression chamber, a firing chamber, adjacent thereto, a piston rotor and an abutment rotor, a piston and an abutment in each of said chambers, shafts for rotating said rotors, a duct for introducing gases into said compression chamber and for leading compressed gases from said compression chamber into said firing chamber, said rotors being operatively connected to rotate in unison, a means for circulating cooling fluid around said chambers, and means for lubricating said rotors, the improvement which comprises an extending portion on each piston adapted to contact the walls of said chamber, seals in said piston adapted to closely contact said walls, each seal including a bearing plate having a bearing face at one end to bear on said walls and a rounded pivot portion at the opposite end, said pivot being in a corresponding recess in the surface of said piston, and spring means for biasing said bearing face against said walls.

12. In a rotary internal combustion motor, a casing, a compression chamber, a firing chamber adjacent thereto, piston and abutment rotors, a piston and an abutment in each of said chambers, ducts for introducing gases into said compression chamber and for leading compressed gases from said compression chamber into said firing chamber, said rotors being operatively connected to rotate in unison, means for circulating cooling fluid around said chambers, and means for lubricating said shafts and rotors, the improvement which comprises a laterally extending portion on each piston adapted to contact the walls of said chamber, seals in said pistons adapted to closely contact said walls, each seal including a bearing plate having a bearing face at one end to bear on said walls and a rounded pivot portion at the opposite end, said pivot being in a corresponding recess in the surface of said piston, and spring means for biasing said bearing face against said walls, said seals being on a plurality of surfaces of said piston and being mutually engaged against accidental displacement by overlapping.

FRANK BERRY.

REFERENCES CITED

The following references are of record in the file of this patent:

UNITED STATES PATENTS

| Number | Name | Date |
|---|---|---|
| 686,394 | Deiwiks | Nov. 12, 1901 |
| 866,693 | Southern et al. | Sept. 24, 1907 |
| 882,750 | Eaton | Mar. 24, 1908 |
| 904,974 | Lee | Nov. 24, 1908 |
| 1,001,677 | Ostergren | Aug. 29, 1911 |
| 1,064,169 | Prall | June 10, 1913 |
| 1,933,415 | Cimins | Oct. 31, 1933 |
| 2,070,631 | Sunderland | Feb. 16, 1937 |
| 2,297,529 | Berry | Sept. 19, 1942 |

FOREIGN PATENTS

| Number | Country | Date |
|---|---|---|
| 9,629 | Great Britain | May 25, 1900 |
| 407,661 | Great Britain | June 15, 1932 |
| 14,335 | France | Sept. 18, 1911 |

(Addition to No. 417,342)

---

Certificate of Correction

Patent No. 2,447,608. August 24, 1948.

FRANK BERRY

It is hereby certified that errors appear in the printed specification of the above numbered patent requiring correction as follows:

Column 3, line 58, for "Rreferring" read *Referring*; column 5, line 34, after the word "chambers" insert the numeral *5*; line 41, for "26 and" read *26 at*; column 6, line 35, for "dischange" read *discharge*; column 8, line 17, for "roto" read *rotor*; line 48, for "aboutment" read *abutment*; column 9, line 12, for "ports 66" read *ports 66'*; column 10, lines 1 and 2, for "immediaately" read *immediately*;

and that the said Letters Patent should be read with these corrections therein that the same may conform to the record of the case in the Patent Office.

Signed and sealed this 21st day of December, A. D. 1948.

[SEAL]

THOMAS F. MURPHY,
*Assistant Commissioner of Patents.* through the walls of said chambers to provide lubrication for said pistons and abutments and means for collecting used oil from the bottom of said casing and recirculating the same.

11. In a rotary internal combustion motor, a casing having a compression chamber, a firing chamber, adjacent thereto, a piston rotor and an abutment rotor, a piston and an abutment in each of said chambers, shafts for rotating said rotors, a duct for introducing gases into said compression chamber and for leading compressed gases from said compression chamber into said firing chamber, said rotors being operatively connected to rotate in unison, a means for circulating cooling fluid around said chambers, and means for lubricating said rotors, the improvement which comprises an extending portion on each piston adapted to contact the walls of said chamber, seals in said piston adapted to closely contact said walls, each seal including a bearing plate having a bearing face at one end to bear on said walls and a rounded pivot portion at the opposite end, said pivot being in a corresponding recess in the surface of said piston, and spring means for biasing said bearing face against said walls.

12. In a rotary internal combustion motor, a casing, a compression chamber, a firing chamber adjacent thereto, piston and abutment rotors, a piston and an abutment in each of said chambers, ducts for introducing gases into said compression chamber and for leading compressed gases from said compression chamber into said firing chamber, said rotors being operatively connected to rotate in unison, means for circulating cooling fluid around said chambers, and means for lubricating said shafts and rotors, the improvement which comprises a laterally extending portion on each piston adapted to contact the walls of said chamber, seals in said pistons adapted to closely contact said walls, each seal including a bearing plate having a bearing face at one end to bear on said walls and a rounded pivot portion at the opposite end, said pivot being in a corresponding recess in the surface of said piston, and spring means for biasing said bearing face against said walls, said seals being on a plurality of surfaces of said piston and being mutually engaged against accidental displacement by overlapping.

FRANK BERRY.

REFERENCES CITED

The following references are of record in the file of this patent:

UNITED STATES PATENTS

| Number | Name | Date |
|---|---|---|
| 686,394 | Deiwiks | Nov. 12, 1901 |
| 866,693 | Southern et al. | Sept. 24, 1907 |
| 882,750 | Eaton | Mar. 24, 1908 |
| 904,974 | Lee | Nov. 24, 1908 |
| 1,001,677 | Ostergren | Aug. 29, 1911 |
| 1,064,169 | Prall | June 10, 1913 |
| 1,933,415 | Cimins | Oct. 31, 1933 |
| 2,070,631 | Sunderland | Feb. 16, 1937 |
| 2,297,529 | Berry | Sept. 19, 1942 |

FOREIGN PATENTS

| Number | Country | Date |
|---|---|---|
| 9,629 | Great Britain | May 25, 1900 |
| 407,661 | Great Britain | June 15, 1932 |
| 14,335 | France | Sept. 18, 1911 |
| | (Addition to No. 417,342) | |

---

Certificate of Correction

Patent No. 2,447,608. August 24, 1948.

FRANK BERRY

It is hereby certified that errors appear in the printed specification of the above numbered patent requiring correction as follows:

Column 3, line 58, for "Rreferring" read *Referring*; column 5, line 34, after the word "chambers" insert the numeral *5*; line 41, for "26 and" read *26 at*; column 6, line 35, for "dischange" read *discharge*; column 8, line 17, for "roto" read *rotor*; line 48, for "aboutment" read *abutment*; column 9, line 12, for "ports 66" read *ports 66'*; column 10, lines 1 and 2, for "immediaately" read *immediately*;

and that the said Letters Patent should be read with these corrections therein that the same may conform to the record of the case in the Patent Office.

Signed and sealed this 21st day of December, A. D. 1948.

[SEAL]

THOMAS F. MURPHY,
*Assistant Commissioner of Patents.*